J. D. WRIGHT.
CAR FENDER.
APPLICATION FILED NOV. 30, 1907.
909,730.
Patented Jan. 12, 1909.
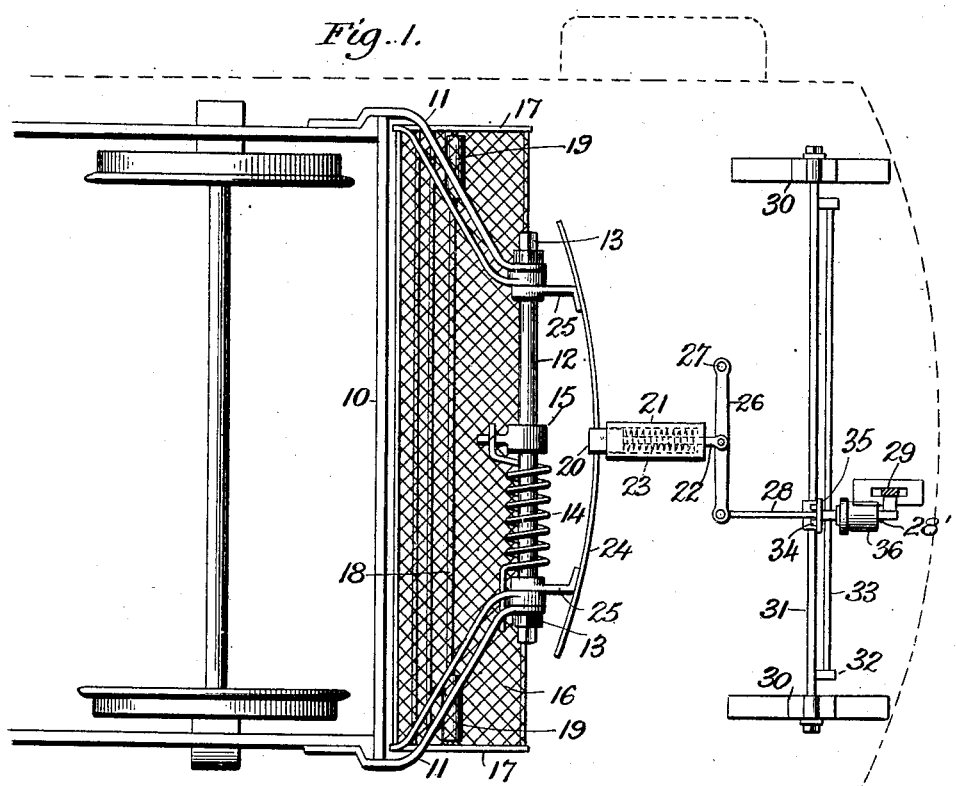
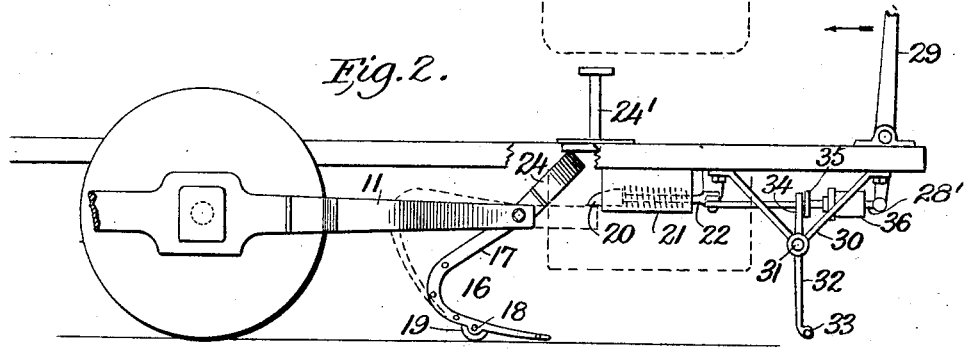
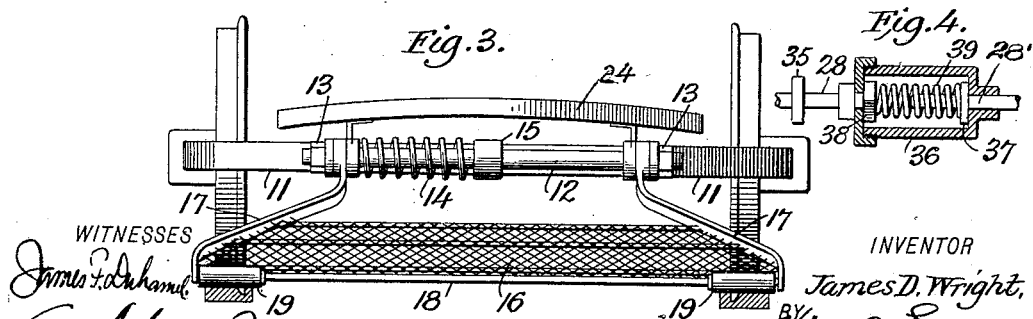
WITNESSES
INVENTOR
James D. Wright,
BY
ATTORNEY
THE NORRIS PETERS CO., WASHINGTON, D. C.

UNITED STATES PATENT OFFICE.

JAMES D. WRIGHT, OF BROOKLYN, NEW YORK.

CAR-FENDER.

No. 909,730.      Specification of Letters Patent.      Patented Jan. 12, 1909.

Application filed November 30, 1907. Serial No. 404,567.

*To all whom it may concern:*

Be it known that I, JAMES D. WRIGHT, a citizen of the United States, residing at Brooklyn, in the county of Kings and State of New York, have invented new and useful Improvements in Car-Fenders, of which the following is a specification.

This invention relates to car fenders and more particularly to that class which is suspended from the frame or truck of the car in front of the forward wheels and is adapted to be dropped to the tracks both automatically and by the motorman in case that any person or object should fall in front of the car while it is in motion and before it can be stopped, as will be described in the following specification, set forth in the claims and shown in the accompanying drawings where like reference characters are used to designate the same parts in the different figures.

Figure 1 is a plan view of the forward truck of a car with the improved fender applied thereto; also the operating parts. Fig. 2 is a side view of the above. Fig. 3 is a front view of the fender. Fig. 4 is a sectional view of the spring connection for the releasing bolt.

This invention is an improvement on the application filed by me Nov. 10, 1906, Serial No. 342,851, and allowed June 1st, 1907 but which I abandon and incorporate in the present application.

The device is to be secured below the body of the car and preferably pivoted to a frame which is secured to the front end of the truck. The truck 10 may be of any desired form or construction and the arms 11 are secured to same and project forward towards the front of the car being turned inward at their front ends to reduce the space between them and these arms have journaled in them a shaft 12 carrying nuts 13 at each end to prevent its removal. The shaft is encircled by one or more springs 14, one end of which is lodged beneath one of the arms 11 while the other end presses upon an arm 15 upon the shaft to throw the arm downward for reasons which will be later explained.

The basket 16 is a frame made up of side pieces 17, cross rods 18 and netting, the latter to break the fall of any one who may be caught in the basket. The side pieces 17 are hook shaped and pivoted at their upper ends to the shaft 12, where they are retained by the nuts 13, and they are braced and held together by the cross rods 18. The lower rod 18 carries at its outer ends, and adjacent to the side pieces, rollers 19 to run upon the car tracks and support the basket. The pressure of the spring 14 upon the arm forces the basket down on the track and if small obstructions are passed the basket readily rides over them.

The basket is normally held up and away from the tracks and ground by a bolt 20 playing in a box 21 which is secured to the lower side of the platform and the bolt has a rearwardly extending stem 22 surrounded by a spring 23 to hold the bolt normally forward in a position to engage a curved rod 24 connected to the shaft 12 by means of the arms 25. The bolt 20 is disconnected with the rod 24, so as to allow the basket to drop, by a lever 26 pivoted at 27 to the platform while the free end of the lever has connected with it a rod 28 attached to the lower end of a lever 29 to be controlled by the motorman. Hung from the under side of the platform by means of the brackets 30 is a shaft 31 having depending arms 32 connected by a cross rod 33 suspended a short distance above the tracks and the upper side of the shaft 31 carries a fork 34 straddling the rod 28 and bearing against a collar 35 thereon when any object such as a human body comes in contact with the rod 33.

When it is desired to release the basket the lever 29 is pulled in the direction of the arrow in Fig. 2 and the bolt 20 withdrawn. The basket falls of its own weight and into a position to pick up a human being or animal. In case the motorman is inattentive the object strikes the bar 33 withdrawing the bolt.

The action of the lever 29 and the bar 33 are made independent by the spring connection shown in Fig. 4 and which consists of a box 36 into one end of which is loosely admitted a section 28' of the connecting rod with a collar 37. The main section of rod 28 also enters the box and is secured thereto by the nut 38, the box thus serving as a rigid connection when the force of the lever 29 is exerted but when the fork 34 presses upon the collar 35 it compresses a spring 39 interposed between the two sections of the connecting rod without influencing the lever 29.

When a fender of this description is secured to the truck of a car the whole of the car track is effectually guarded so that any object on the track is protected from the wheels. The curved bar 24 is free to travel over the bolt 20 which retains it even if the relations of the car body and the truck do change relations.

At the same time the basket is made to cover the tracks so that the rollers 19 keep to the tracks and properly support the basket.

In order to readily and quickly return the basket to its elevated position a plunger 24' plays through the platform and bears against the bar 24 so that it may be forced down by the foot of the motorman.

It is obvious that minor modifications may be resorted to in the construction of this device without departing from the essential features above described.

What I claim as new and desire to secure by Letters Patent is:

1. In a car fender, the combination of a basket pivoted at the front of the truck, a bar at the front of the basket, a spring pressed bolt engaging the bar, a lever to be operated by the motorman and a rod connecting the lever with the bolt.

2. In a car fender, the combination of a basket pivoted to the front of the truck, a bolt secured to the lower side of the platform and controlled by a spring, means upon the basket for coöperation with the bolt, a lever connected with the bolt to withdraw same and automatic means connected with the bolt to operate it.

3. In a car fender, the combination with a shaft pivoted in a forward extension of the truck, a basket secured to the shaft, a curved extension at the front of the shaft, a spring pressed bolt to engage same, a lever to be operated by the motorman, a rod connecting the lever with the bolt, a cross bar pivoted in front of the basket and adapted to operate the connecting rod, a spring joint in the rod to permit of its operation by the cross bar without interfering with the lever, and means for returning the basket to the bolt.

4. In a car fender, the combination with a shaft pivoted in a forward extension of the truck, a basket on the shaft, a curved extension on the basket, a spring pressed bolt, a lever connected with the bolt and operated by the motorman, a spring interposed in said connection, a fork straddling the connection and operating against the spring and to withdraw the bolt, a frame connected with the fork and near the track and a plunger adapted to be pressed upon the curved extension to raise the basket.

In testimony whereof, I affix my signature in presence of two witnesses.

JAMES D. WRIGHT.

Witnesses:
JAMES F. DUHAMEL,
MAE W. CLINTON.